United States Patent
Jha et al.

(10) Patent No.: US 12,373,874 B2
(45) Date of Patent: Jul. 29, 2025

(54) RECOMMENDATION SYSTEM WITH SPARSE FEATURE ENCODING

(71) Applicant: Intel Corporation, Santa Clara, CA (US)

(72) Inventors: Gopi Krishna Jha, Bangalore (IN); Anthony Thomas, San Diego, CA (US); Nilesh Jain, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 672 days.

(21) Appl. No.: 17/557,949

(22) Filed: Dec. 21, 2021

(65) Prior Publication Data

US 2022/0114644 A1 Apr. 14, 2022

(30) Foreign Application Priority Data

Oct. 5, 2021 (IN) .............................. 202141045233

(51) Int. Cl.
| | |
|---|---|
| *G06Q 30/06* | (2023.01) |
| *G06N 20/00* | (2019.01) |
| *G06Q 30/0601* | (2023.01) |
| *H04L 9/06* | (2006.01) |

(52) U.S. Cl.
CPC ......... *G06Q 30/0631* (2013.01); *G06N 20/00* (2019.01); *H04L 9/0643* (2013.01)

(58) Field of Classification Search
None
See application file for complete search history.

(56) References Cited

U.S. PATENT DOCUMENTS

| 7,831,476 B2* | 11/2010 | Foster | G06Q 30/0625 |
| | | | 705/26.8 |
| 9,406,024 B1* | 8/2016 | Gordon | G06N 5/04 |
| 10,565,528 B2* | 2/2020 | Lokare | G06F 17/16 |
| 10,885,461 B2* | 1/2021 | Garvey | G06F 16/285 |
| 11,250,461 B2* | 2/2022 | Song | G06N 3/08 |
| 11,295,346 B1* | 4/2022 | Pan | G06N 3/082 |
| 11,531,927 B2* | 12/2022 | Modarresi | G06F 16/285 |
| 2009/0097548 A1* | 4/2009 | Karczewicz | H04N 19/33 |
| | | | 375/240.03 |

(Continued)

OTHER PUBLICATIONS

Demiriz, A., Enhancing product recommender systems on sparse binary data, (Abstract only), Data Mining and Knowledge Discovery 9.2: 147-170. Springer. Sep. 2004. (Year: 2004).*

(Continued)

*Primary Examiner* — Nicholas D Rosen
(74) *Attorney, Agent, or Firm* — Akona IP PC

(57) ABSTRACT

A recommendation system includes a recommendation model for generating a recommendation score for a user with respect to an item. The model is configured to receive a set of dense features, describing numerical information, and a set of sparse features, representing a subset of items from a relatively large group of items. To represent the subset of items in the sparse features, each item (or a symbol thereof) is processed by an encoder to represent each item with a plurality of positions in a sparse binary representation of the subset of items. The sparse binary representation is then processed by a model that determines a vector representation of the sparse category features used in the prediction in conjunction with the dense features.

20 Claims, 7 Drawing Sheets

(56) References Cited

U.S. PATENT DOCUMENTS

| | | | | |
|---|---|---|---|---|
| 2016/0232449 | A1* | 8/2016 | Gordon | G06Q 30/0631 |
| 2017/0193592 | A1* | 7/2017 | Avidan | G06Q 10/087 |
| 2017/0249563 | A1* | 8/2017 | Garvey | G06F 16/285 |
| 2019/0164083 | A1* | 5/2019 | Modarresi | G06N 20/00 |
| 2019/0251467 | A1* | 8/2019 | Lokare | G06F 17/16 |
| 2020/0050846 | A1* | 2/2020 | Sharma | G06N 5/00 |
| 2020/0279288 | A1* | 9/2020 | Song | G06N 3/08 |
| 2021/0064968 | A1* | 3/2021 | Lupien | G06N 3/08 |
| 2021/0288827 | A1* | 9/2021 | Celozzi | H04L 12/1467 |
| 2022/0092645 | A1* | 3/2022 | Pan | G06N 20/00 |
| 2022/0300836 | A1* | 9/2022 | Rossi | G06F 18/213 |

OTHER PUBLICATIONS

Li, Y., et al., "A Sparse Recommendation-Based Algorithm for Pattern Localization in Brain Imaging Data Analysis," PLoS ONE 7:12: e50332. Public Library of Science. (Dec. 5, 2012). (Year: 2012).*

Mehta, S., et al., "Learning to Segment Breast Biopsy Whole Slide Images," Ithaca: Cornell University Library, arXiv.org. (Oct. 10, 2017) (Year: 2017).*

Desai, Aditya, "Semantically Constrained Memory Allocation (SCMA) for Embedding in Efficient Recommendation Systems," arXiv: 2103.06124v1 [cs.IR] Feb. 24, 2021, 14 pages. (Year: 2021).*

Chen, Wenlin, et al, "Compressing Neural Networks with the Hashing Trick," arXiv:1504.04788v1 [cs.LG] Apr. 19, 2015; 10 pages.

Ginart, A.A., "Mixed Dimension Embeddings with Application to Memory-Efficient Recommendation Systems," arXiv:1909.11810v3 [cs.LG] Feb. 8, 2021; 16 pages.

Gupta, Udit, et al., "The Architectural Implications of Facebook's DNN-based Personalized Recommendation," arXiv:1906.03109v4 [cs.DC] Feb. 15, 2020; 14 pages.

Kang, Wang-Cheng, et al., "Learning to Embed Categorical Features without Embedding Tables for Recommendation," KDD'21, Aug. 14-18, 2021, Virtual Event, Singapore; 11 pages.

Naumov, Maxim,, et al., "Deep Learning Recommendation Model for Personalization and Recommendation Systems," arXiv:1906.00091v1 [cs.IR] May 31, 2019; 10 pages.

Serra, Joan, et al., "Getting Deep Recommenders Fit: Bloom Embeddings for Sparse Binary Input/Output Networks," RecSys '17, Aug. 27-31, 2017, Como, Italy; 9 pages.

Shi, Hao-Jun Michael, et al., "Compositional Embeddings Using Complementary Partitions for Memory-Efficient Recommendation Systems," KDD '20, Aug. 23-27, Virtual Event, USA; 11 pages.

* cited by examiner

RECOMMENDATION SYSTEM WITH SPARSE FEATURE ENCODING

CROSS-REFERENCE TO RELATED APPLICATIONS

The present application claims priority to Indian Provisional Patent Application No. 202141045233, filed on Oct. 5, 2021, the contents of which are hereby incorporated by reference in its entirety.

TECHNICAL FIELD

This disclosure relates generally to recommendation systems, and particularly to the representation of sparse data in recommendation systems.

BACKGROUND

Recommendation systems are AI algorithms that suggest products or advertisements to users based on their preferences and the preferences of other similar users. Recommender systems take the form of a mathematical model which must be trained by applying an optimization algorithm to a data set which typically contains a mix of numeric and categorical information. The categorical information typically includes items that have been interacted with by users (e.g., for a video recommendation system, the videos viewed by a user and/or ratings provided by users for various videos). Information about categorical information is often represented in recommendation systems by training "embedding tables" that map categorical data (e.g., a specific item) to a vector representation (e.g., an 'embedding' that represents the item). These embedding tables are generally trained during the optimization process and are critical to the success of typical modern recommendation systems. However, the size of the embedding tables generally grows linearly with the amount of data on which models are trained and the number of items in a category. The large number of parameters and retrieval of such tables to effectively represent categorical information can impose significant scalability bottlenecks in terms of memory use and compute resources needed to train and apply such models. In many solutions, to account for various items in a category of sparse data (e.g., each of the videos viewed by a user), the separate embeddings for each of the items used in the recommendation are retrieved and then processed (e.g., combined) to generate a recommendation, requiring significant and unpredictable data accesses. In addition, individual embeddings are typically infrequently or irregularly used, making effective caching difficult and further challenging effective run-time operation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
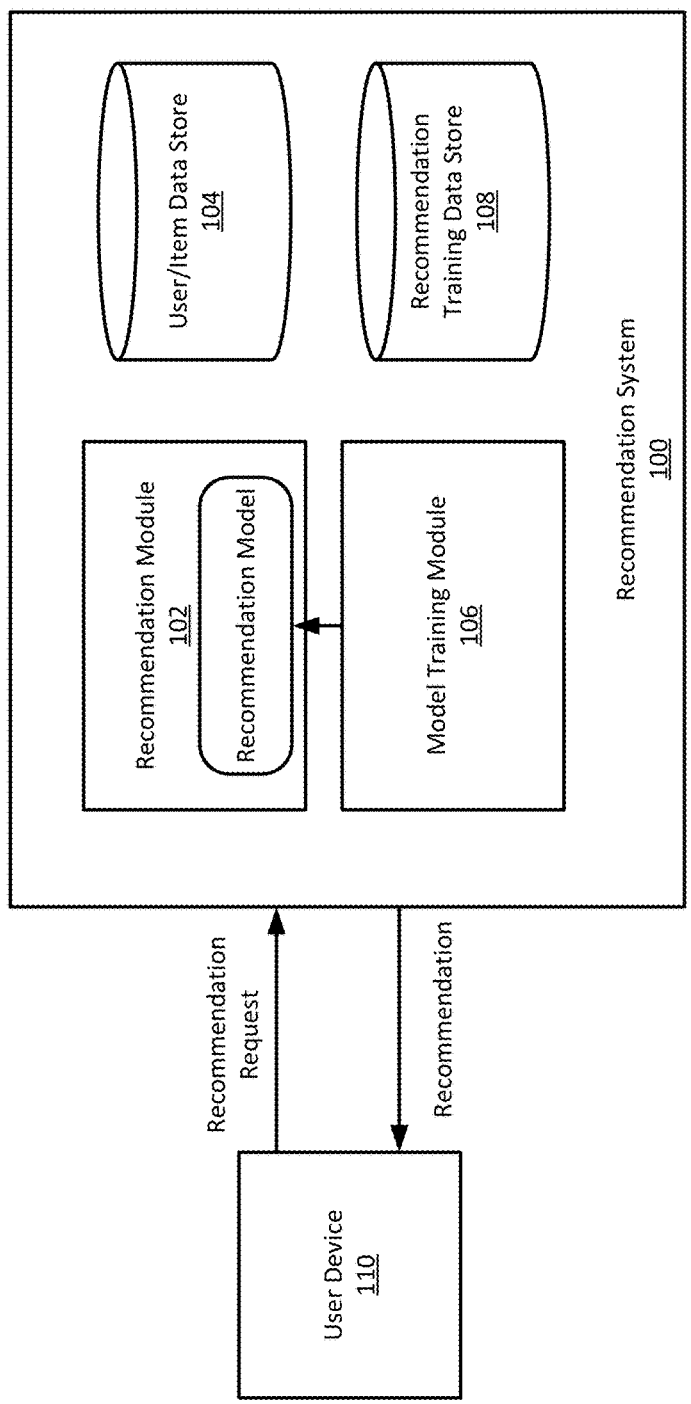
FIG. 1 is an example recommendation system that generates recommendations for a user, according to one embodiment.

Described herein is a recommendation model and related system for effective for determining a recommendation score for an item for a user. To provide such recommendations for a user with respect to a particular item, recommendation system uses a set of dense features and a set of sparse features to characterize the user and/or item as an input to a recommendation model and determine a recommendation score for user with respect to that item. The set of sparse features (also termed sparse category features) describe a subset of items from a category having a large number of items. Because the category may include a large number of unique items, each item may be considered or represented as a unique "symbol" in an "alphabet" of symbols for the category as a whole (e.g., each item is represented by a particular symbol in the alphabet). As such, the subset of items in the set of sparse features may be considered a subset of symbols selected from or belonging to an alphabet for the category. The subset is typically less than 1% of the number of symbols in the category, and may be 0.1%, 01%, or smaller. For example, sparse features for a category of books may specify books read by a user (represented as a subset of symbols) relative to all published books (a category of items with an "alphabet" of symbols representing each of the books). To characterize the sparse category features in the recommendation model, the subset of symbols is encoded to generate a sparse binary representation of the subset. In one embodiment, the encoder applies a plurality of hash filters to each item/symbol in the subset to determine a "multi-hot" binary array for the respective item/symbol in the subset. I.e., the encoder may designate a plurality of indices or positions in the array to be set to a value of one. The sparse binary representations for the symbols are then combined to determine the sparse binary representation for the subset of items as a whole, such that the combined sparse binary representation includes a value of one where any of the binary arrays has a value of one (e.g., for any designated indices/positions of the multi-hot array). In one embodiment, the sparse binary representation is generated by applying a bloom filter to the sparse category features.

The sparse binary representation is then processed by a trained computer model, termed a category feature model, to determine a vector representation, termed a category vector representation, which characterizes the subset of items as a multidimensional vector. The category vector representation is then used with the set of dense features (which may also be further processed to a vector representation) to generate the recommendation score. By encoding the sparse category information and determining the vector representation with a computer model applied to encoding, the recommendation system can generate recommendation scores with fewer learned parameters, reduced memory access requirements, and/or equivalent or better accuracy than other recommendation model architectures. This approach may also improve runtime, caching and other computational requirements relative to other recommendation approaches.

For purposes of explanation, specific numbers, materials, and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. The meaning of "a," "an," and "the" include plural references. The meaning of "in" includes "in" and "on."

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. The terms "substantially," "close," "approximately," "near," and "about," generally refer to being within +/−20% of a target value. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

Recommendation System Overview

FIG. 1 is an example recommendation system 100 that generates recommendations for a user, according to one embodiment. The recommendation system 100 may be used for making various suggestions to a user, typically based on information about the user and information of other users.

The recommendations may be generated for various types of content, such as books, videos, music, articles, social networking posts, web pages, and so forth. In various types of recommendation systems, a recommendation score may be generated to quantify the recommendation. The recommendation score may represent a likelihood that a user will interact with an object or piece of content, such as an advertisement, or interact positively with another user, for example in a dating application or when suggesting a connection to a user on a social network. As such, the particular thing being evaluated for a recommendation may vary widely according to the particular type of recommendation system and the particular use case. For ease of reference herein, the particular object being evaluated for a recommendation is referred to as an "item" and the principles of this disclosure may apply to any type or category of recommendation that may operate according to the principles discussed herein. Thus, although the object of the recommendation may be a book, movie, person, group, piece of content, webpage, advertisement, etc., these may generally be referred to as an "item" for which a recommendation may be generated. The recommendation score may thus be generated for a particular user with respect to a particular item. In practice, recommendation scores may be generated for several items and used to select particular items to recommend to the user. For example, the recommendation scores for the items may be ranked, and a number (e.g., 1, 3, 5, etc.) of the items associated with the highest-ranked recommendation scores may be selected as the recommendation for the user.

As shown in the embodiment of FIG. 1, a user device 110 may communicate with a recommendation system 100 to provide a recommendation request and receive a recommendation in return from the recommendation system 100. The user device 110 may include any computing device that may receive information with a user and communicate with the recommendation system 100. The user device 110 typically is a separate system from the recommendation system 100 and communicates with the recommendation system 100 via a network (not shown) or other communication channel for messages between computing systems.

The recommendation request may take various forms depending on the particular configuration and type of items being recommended by the recommendation system. For example, in some systems the recommendation request may include information from a user describing the recommendation request and information that may be used to determine the recommendation. For example, a user may provide a set of books that the user has read and request a book suggestion from the recommendation system. In other embodiments, the recommendation request is a message from the user device 110 requesting an item presentation to the user, such that the recommendation scores are used to select content for presentation. For example, the user device 110 may be operating an application for viewing a content feed, movies, music, or a website on which content or advertisements are presented. In these examples, the recommendation request may be for a set of content to present to the user (e.g., selected content for a feed, recommended movies or music, selected advertisements, etc.). This request for content may operate as a request for a "recommendation" for which the recommendation system 100 generates a recommendation. Similarly, the recommendation provided by the recommendation system 100 may include the content of the recommended items. For example, recommendation scores may be generated for content items to be included in a content feed and the recommendation system may provide the recommended content items for the user device 110 to present to the user.

The recommendation request may also include information for identifying the user device 110, a user of the device (e.g., login credentials or token, or other persistent identifier of the user device 110), and/or characteristics or behaviors associated with the user device 110 or a profile thereof (e.g., browser cookies, website access or interaction information, and so forth). Generally, as discussed further below, information used for making a recommendation may be provided by the user device 110 (e.g., included with the recommendation request) or may be accessed by the recommendation system 100 by other means. When the user device 110 receives the recommendation, the user device 110 may provide the recommendation to a user or other individual(s) interacting with the user device 110. For example, the user device 110 may receive a recommended item and present the item or information about it, such as an image, video, audio, description of the item (e.g., a description or summary of a book) and so forth. The particular configurations vary according to the specific circumstances of the type of item being recommended.

The recommendation system 100 includes various components to generate recommendation scores for users with respect to particular items. Generally, the recommendation system 100 includes a repository of information about particular users, items, and the interactions between users and items in a user/item data store 104. The recommendation system 100 includes a recommendation module 102 that generates recommendation scores using a recommendation model and may determine a particular recommendation. The recommendation model structure is discussed in additional detail further below. The recommendation system 100 may also include a model training module 106 that trains the recommendation model using a set of training data that may be stored in recommendation training data store 108.

As discussed below with respect to FIGS. 5-6, computer models typically include parameters that are used to process inputs to predict outputs. Such computer models may be iteratively trained to learn parameters, including weights, for predicting various outputs based on input data. As discussed further in FIG. 6, individual layers in a neural network may receive input activations and process the input activations to generate output activations of the layer. The specific set of layers, interactions between layers, input representations, etc., can vary from implementation to implementation, and different combinations of neural network architectures (or other computer model types) and hardware accelerators may perform differently based on different tasks to be performed. Thus, computer model architectures that may be developed using the disclosed approaches include the types discussed below, including various types of neural networks and hardware accelerators.

Although shown here for convenience as including the model training module 106, in various implementations the recommendation module 102 and the application of a trained recommendation model may be on separate systems from the model training module 106. The recommendation model may be trained at one system, and the resulting model may be distributed to various different systems or servers for generating recommendations used to select and provide content for a large number of user devices. For example, the recommendations may be used to support distributed systems and platforms that may serve millions, tens of millions, or hundreds of millions of user devices. Such systems may include many additional software or hardware components that are not discussed here.

Depending on the particular configuration, the user/item data store 104 may include a large variety of information about users, items, and user interactions with items. As an initial matter, although referred to as "users," such users may not refer to individual persons. Rather, a "user" generally refers to a profile of associated information, typically persisting over time, for which recommendations may be generated. Thus, a "user" may be associated with a specific person, handle, username, or login credentials (although in many cases a user is a specific username) A "user" may include other mechanisms for forming profiles of associated information and interactions with items. For example, a "user" may be an identifier of a browser or a device identifier that may be associated with various actions persistently over time. Such identifiers may be stored by browser cookies or other persistent ways of storing interaction information.

In different configurations, the user/item data store 104 may include a large and varied amount of information about different users and the items that may be recommended. To determine a recommendation score with a recommendation model for a particular user with respect to a particular item, various related information may be retrieved to be used as inputs for the recommendation model. Relevant to this disclosure, the information used for the recommendation model may include a set of dense features and a set of sparse features.

The set of dense features refers to information for a user or item that is compactly or numerically represented. The dense features vary in different applications. For example, in a video recommendation system, dense information about a user may include an age, geographic location, a total number of videos viewed by the user, a number of videos viewed in each of several defined categories, a frequency that the user accesses the recommendation system, the average length of video viewed by the user, etc. Similarly, dense features about an item for a video recommendation system may include the length of the item, the number of users who have viewed the item, etc. As such, each of the dense features generally describes numerical, measurable, or categorizable information.

The set of sparse features refers to information describing preferences or interest information with respect to a relatively small number of objects within a larger category. Referring back to the "books" example discussed above, sparse features may identify individual books read by a user. As users typically like and read different books, the individual books read by each user may significantly differ as some users will have read a small number of books and others will have read a large number, and there may be varying levels of intersection between books read by different users. Further, the group of all books that have been read by any user may be very large relative to the number of books read by any individual user. Each individual item (in this example, each particular book) may be represented as a unique symbol (e.g., an identifier of the item). As such, the group of all books may be characterized as an "alphabet" of the symbols associated with each of the individual books. For an individual user, the books read by that user may thus be represented as a subset of symbols selected from the alphabet. The subset of symbols may thus represent the specific books read by a user from among the alphabet of symbols representing all books represented in the system.

Figure 4:
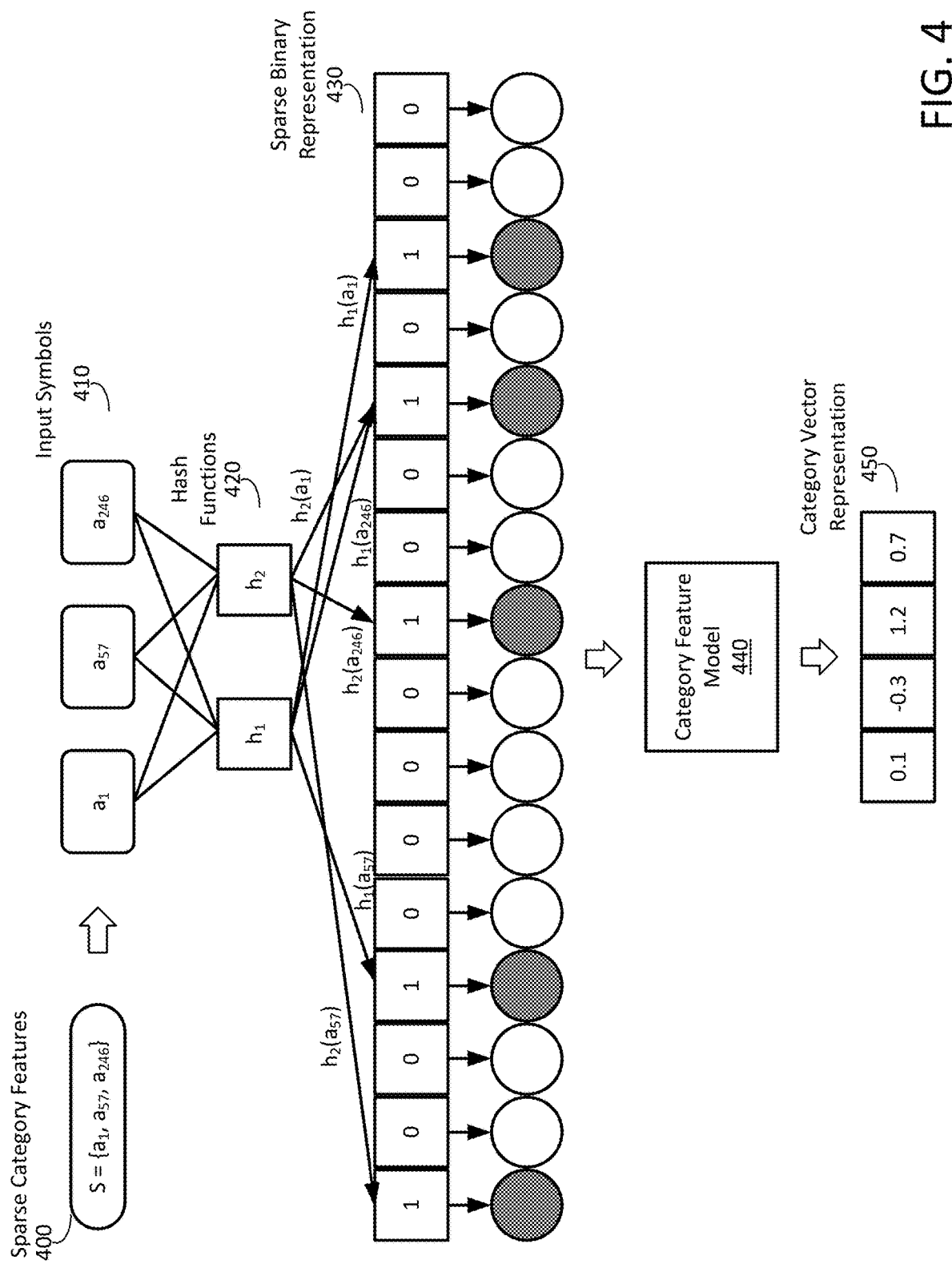
FIG. 4 shows an example of generating a sparse binary representation and category vector representation from sparse category features, according to one embodiment.

This "books" example provides one example of sparse features that may be used to describe a subset of items with respect to a plurality of items related to a particular category. The specific items in the category and how the subset of items is selected will differ in various recommendation systems, and a particular recommendation system may include sparse features related to several different categories of items. For example, a content selection system for a newsfeed may include sparse features describing interactions with items presented in a newsfeed, and another set of sparse features describing interactions with advertising content. Likewise, different sets of sparse features may be used to describe different interactions or relationships with the same group of items. For example, in a recommendation system that recommends videos, one set of sparse features may include a subset of videos, from a set of all videos, for which a user has watched at least one minute of the related video, and another set of sparse features may include a subset of videos, from the same set of all videos, for which the user has watched the video to completion. By characterizing the individual subset of items selected from the group as symbols selected from an alphabet, the data related to an individual user may be compactly represented (e.g., as a list of symbols) and the recommendation system may make fine-grained recommendation determinations despite that the number of items in a category (and the associated alphabet of symbols) may number in the hundreds of thousands, millions, ten millions, etc. Described more formally, the sparse features S for a category (also termed "sparse category features") may be represented as a subset of symbols selected from an alphabet A containing a set of symbols $\{a_1, a_2, \ldots, a_n\}$. FIG. 4, further discussed below, shows an example subset S with symbols $a_1$, $a_{57}$, and $a_{246}$.

Figure 2:
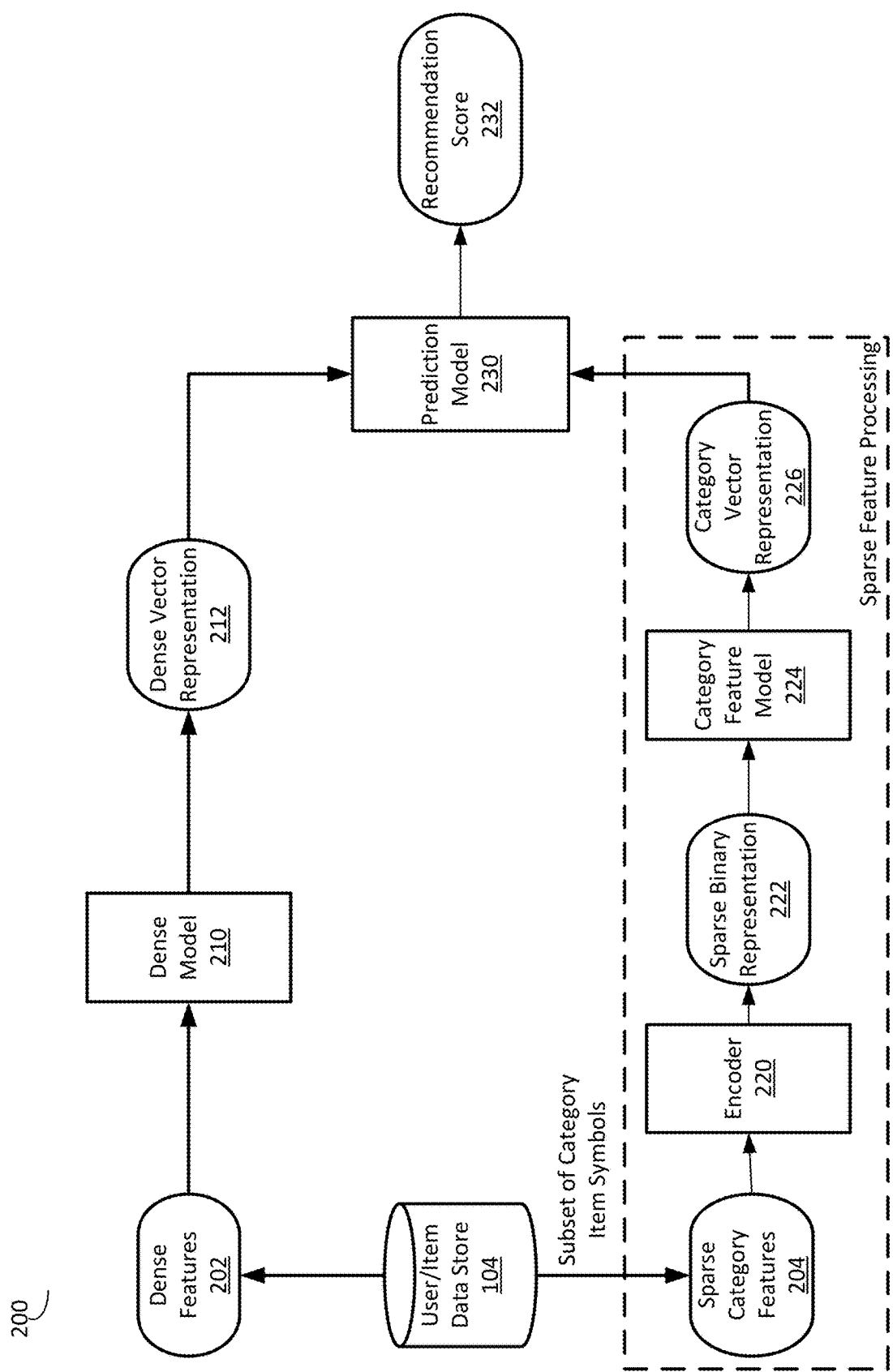
FIG. 2 shows an example architecture for a recommendation model according to one embodiment.

FIG. 2 shows an example architecture for a recommendation model 200 according to one embodiment. The recommendation model 200 may include various subcomponents and intermediate data representations that together may generate a recommendation score 232 for a particular user with respect to a particular item. As a general overview, the user/item data store 104 is accessed to retrieve a set of dense features 202 and a set of sparse category features 204 to be used in the prediction. The specific data used may vary in different configurations, and may include information related to the user, information about the item, and information that may relate to both. As discussed above, the sparse category features 204 may represent a subset of the items in a category as a subset of symbols selected from an alphabet associated with the category. The dense features 202 and the sparse category features 204 may be processed by separate branches to generate a vector representation for the dense features 202 and the sparse category features 204, respectively denoted a dense vector representation 212 and a category vector representation 226. These vector representations may then be combined and input to a prediction model 230 to generate the recommendation score 232.

Although shown as distinct components, the recommendation model 200 in various embodiments may include more or fewer components. In addition, while shown here as separate components, these components depict functional aspects of the recommendation model that may represent layers or data representations that be incorporated into a single operational model. As such, the parameters of the various components may be jointly trained. These jointly trained parameters may include weights, a bias, activation function, etc., for layers of the various components, along with various hyperparameters further discussed below, such as a width of a sparse binary representation 222 or functions used in encoder 220.

The dense features 202 may be processed by a dense model 210 (e.g., one branch of the overall recommendation model) before it is input to a layer that also processes the sparse category-related features. In these embodiments, the dense model 210 represents one or more computer model layers for generating a dense vector representation 212 of the dense features 202. The dense model 210 may include one or more computer model layers for processing the dense features 202 and may include any suitable computer model architecture according to the particular use of the recommendation model. The dense model 210 in one embodiment is a multi-layer perceptron (MLP) that includes one or more layers to weigh and combine the dense features 202 to generate the dense vector representation 212. The dense vector representation 212 is typically a multi-dimensional vector, having components in a plurality of dimensions. Stated another way, the dense vector representation 212 may be considered an array of values, where each position in the array represents a "dimension" and the associated value describes a component of the vector in that dimension. The dense model 210 thus describes the parameters for mapping the dense features 202 to the dense vector representation 212. To the extent the dense model 210 may be considered a separate branch of a joint recommendation model, the dense vector representation 212 may also be described as the output activations of the dense model 210 before joint processing with the prediction model 230.

Figure 3:
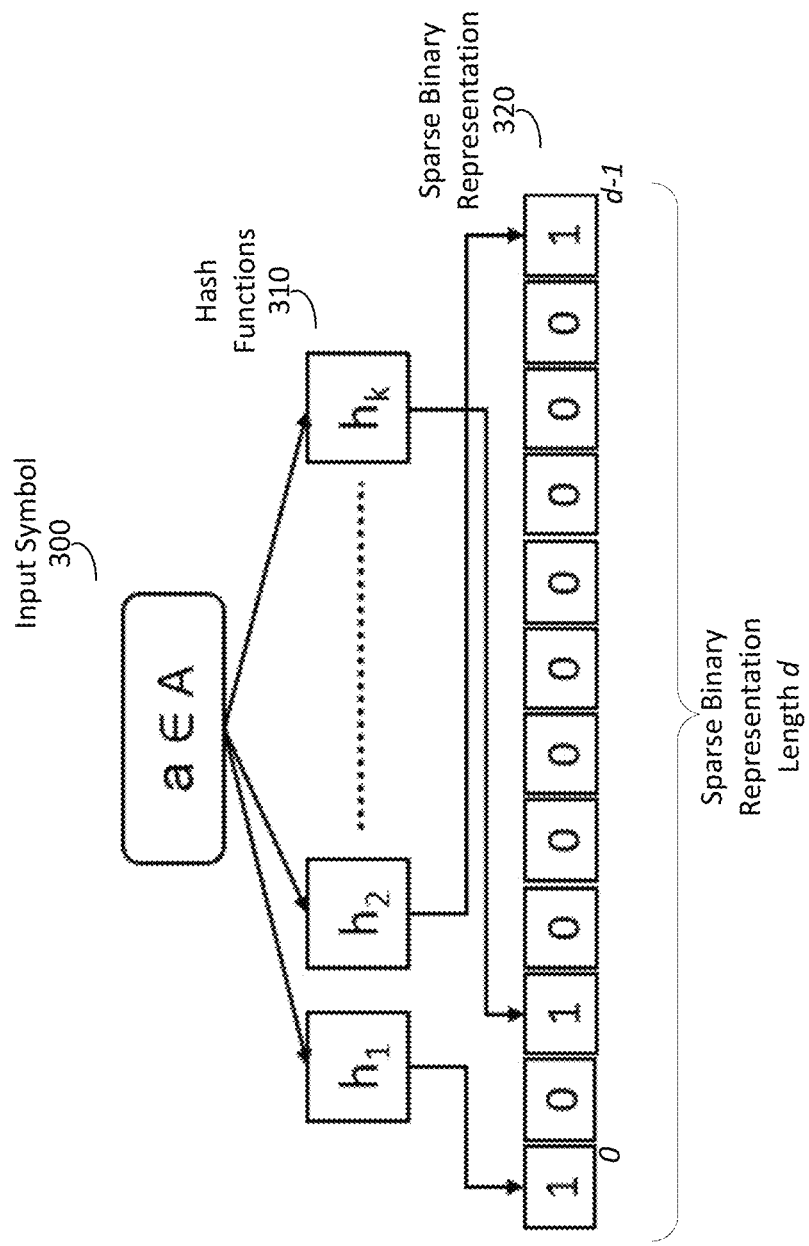
FIG. 3 shows an example of an encoder applied to a symbol in a set of sparse category features, according to one embodiment.

Instead of directly generating a similar representation, the sparse category features 204 are processed by an encoder 220 to generate a sparse binary representation 222, which may then be processed by a category feature model 224 to generate a category vector representation 226. Although FIG. 2 shows the processing for one set of sparse category features 204 (e.g., a subset of books read by a user selected from a group of all books), in various embodiments multiple types/categories of sparse features are processed by the recommendation model and may be included as part of the input to the prediction model 230. Each set of sparse features may represent a different category of items, for example movies, books, content items, etc., or different interactions by users with these categories. In general, the symbols of the sparse category features 204 are processed by an encoder 220 to generate a sparse binary representation 222. Where the sparse category features 204 may describe the sparse features as a list of symbols (e.g., a subset from the alphabet of symbols), the sparse binary representation 222 represents the subset of symbols as a binary representation, such as a binary array, thus converting the list of an unknown size to a binary representation, typically of a fixed size. The sparse binary representation 222 is then processed by a category feature model 224 to determine a category vector representation 226 that may compactly represent the subset of symbols for use with the prediction model 230. Similar to the dense model 210 and its dense vector representation 212, the category feature model 224 may include any suitable computer model, including one or more layers with parameters and weights to generate the vector representation of the sparse features as the category vector representation 226. As noted above with respect to the dense vector representation 212, the category vector representation 226 may be considered an activation output of a branch of the recommendation model 200 that separately processes the sparse category-related information before combined feature processing by the prediction model 230. FIGS. 3 & 4 and related discussion below further describe the sparse feature processing for a category.

As indicated above, in various embodiments, more than one set of sparse category features 204 may be used corresponding to different categories of sparse features and which may also correspond to separate symbol alphabet. Each category may be processed by a separate branch to generate a corresponding category vector representation 226 for use with the prediction model 230. As such, each category of sparse category features 204 used in the recommendation model may be processed by an encoder 220 and category feature model 224. The structure and parameters of the encoder 220 and category feature model 224 may differ for each category and may be trained independently or jointly with other parameters of the overall recommendation model. For example, different categories may include a different number of items, yielding a different alphabet size for another category, which may also modify the parameters of the encoder 220, size of the sparse binary representation, size of the category feature model 224, size of the category vector representation 226, and so forth. In other embodiments, one category of sparse category features may use an encoder 220 and category feature model 224 as shown in FIG. 2, while another category of sparse category features may be processed or characterized in another way. As such, while one category of sparse features may be processed as shown by the sparse feature processing of FIG. 2, other categories may be included and processed in similar or different ways.

The prediction model 230 receives the dense vector representation 212 and category vector representation 226 and generates a recommendation score 232. As with the dense model 210, the prediction model may be any suitable type of computer model and may include various layers for analyzing and processing the received vector representations. In one embodiment, the prediction model 230 is a multi-layer perceptron. The prediction model 230 may include one or more aggregation layers (not shown) that combine the dense vector representation 212 and category vector representation 226. In one example, the aggregation layer concatenates the dense vector representation 212 with the category vector representation 226.

The prediction model 230 outputs a recommendation score 232 that denotes a strength of the recommendation for the user with respect to the evaluated item. In one embodiment, the recommendation score is a probability that the user will interact with the item. For example, in some embodiments the recommendation model may be trained to characterize users and items based on a sequence of user interactions for a number of days (e.g., five days) and predict the likelihood a user will interact with a specific item on a following day (e.g., the sixth day). The recommendation score 232 may thus predict the likelihood of a user interacting with an item.

FIG. 3 shows an example of an encoder applied to a symbol in a set of sparse category features, according to one embodiment. The example encoder shown in FIG. 3 shows an example of processing a single input symbol 300 by an encoder to yield a sparse binary representation 320 of the input symbol 300. In this example, the input symbol a belongs to an alphabet A of symbols $\{a_1, \ldots, a_n\}$ for the category. The sparse binary representation 320 may be an array having a specified width d. As such, the sparse binary representation 320 may include a number of positions from [0 to d−1]. In this example, the sparse binary representation 320 may be initialized to values of zero. The encoder may be applied to the input symbol 300 to identify a number of indices to set to a value of one in the sparse binary representation 320. Each of the positions in the sparse binary representation 320 corresponding to the indices specified by the encoder may then be set to a value of one.

In one embodiment, the encoder includes a set of hash functions 310, each of which applies a hash to the input symbol 300 (e.g., the numerical value of the input symbol 300) to specify an index or bin relative to the length d of the sparse binary representation. In one embodiment, the set of hash functions 310 includes k hash functions. As shown in FIG. 3, each of the k hash functions $\{h_1, \ldots, h_k\}$ specifies an individual index or "bin" for the input symbol 300. As each input symbol 300 is processed by the set of hash functions 310, the resulting set of indices thus represents the input symbol 300 in the sparse binary representation 320. While each hash function 310 may differ in its function for determining an output index (e.g., a bin or hash value) from an input value, in general the hash functions 310 may be expected to distribute input values into evenly into output index values (i.e., output hash values of the hash function) across the width d of the sparse binary representation. The hash functions may belong to a family of hash functions, such that the hash functions may be readily initialized to differently hash the input values to different indices evenly across the sparse binary representation 320. In one embodiment, the hash functions 310 belong to a family of murmur hash functions, although other types of hash functions for distributing input values across a range of outputs may also be used.

As such, while the input symbol 300 may be selected from the alphabet having N symbols, the encoder (e.g., via the hash functions 310), may generate a "multi-hot" representation of the input symbol in the sparse binary representation 320. Because each input symbol a, after encoding, is represented by a plurality of positions in the sparse binary representation, as the size N of the alphabet A increases, the width d of the sparse binary representation may increase at a slower rate, e.g., at a rate of O(log n), while maintaining effective representation of the alphabet in the multi-hot encoding of the sparse binary representation 320. As discussed more fully below, the number of indices designated by the encoder (e.g., based on the number of hash functions k) and the width d of the sparse binary representation may be configurable and determined during training of the model. The number of indices specified by the encoder and the width d of the sparse binary representation may affect the number of positions that an input symbol 300 may be represented in the sparse binary representation, and, thus the likelihood of a collision with other symbols and the number of locations from which a category feature model may learn to affect the category vector representation using the sparse binary representation related to a symbol. While hash functions 310 providing a single output are shown here, in additional embodiments, alternate functions may be used for generating a plurality of indices into the sparse binary representation 320 to represent an input symbol 300. For example, the functions may each output more than one index for the input symbol 300.

FIG. 4 shows an example of generating a sparse binary representation 430 and category vector representation 450 from sparse category features 400, according to one embodiment. As discussed above, the sparse category features 400 may include a subset of symbols from an alphabet A related to a particular category of items. In this example, the sparse category features 400 is represented as a subset S including the symbols $a_1$, $a_{57}$, and $a_{246}$. As shown, the sparse category features 400 may thus describe the relevant items in a category as a list of symbols representing the items. To determine a sparse binary representation 430 of the sparse category features 400, the encoder may be applied to each of the input symbols 410 to generate a plurality of indices for each input symbol 410. In the example shown in FIG. 4, the encoder may include two hash functions 420, designated $h_1$ and $h_2$. As shown in this example, the encoder (here, hash functions $h_1$ and $h_2$) may be applied to each input symbol 410 to determine a plurality of indices in the sparse binary representation 430 associated with each input symbol 410. As such, in this example the input symbol $a_1$ may be applied as an input to hash function h1 to identify an index determined by $h_1(a_1)$ and applied as an input to hash function h2 to identify an index determined by $h_2(a_i)$. Similarly, a plurality of indices is determined from the hash functions $h_1$, $h_2$ for each of the other input symbols $a_{57}$ and $a_{246}$. To determine the sparse binary representation for the list of symbols (i.e., for the subset of symbols in the alphabet) of sparse category features 400), the plurality of indices for each input symbol 410 are combined in the sparse binary representation 430. In this example, the sparse binary representation may include a value of one at any position corresponding to all of the values in the plurality of indices for each of the symbols. Described another way, the sparse binary representation corresponding to each symbol may be combined, such that any value of one in the sparse binary representation of a symbol (e.g., as shown in FIG. 3), yields a value of one in the sparse binary representation 430 for the combined symbol representation. When there is a collision (e.g., more than one input symbol hashes to the same index value), the collision may be resolved by designating a value of one at the position with the collision. In the example shown in FIG. 4, the index designated by $h_1(a_{246})$ and $h_2(a_1)$ both indicate the same index, which may yield a value of one in the resulting sparse binary representation that represents the subset of input symbols 410 in the sparse category features 400. In some embodiments, the application of hash functions 420 to the input symbols 410 to generate the sparse binary representation 430 may comprise a bloom filter.

In this example, the sparse binary representation 430 may thus represent the specific, unique subset of input symbols 410. Although individual input symbols within a given subset may collide when the encoder is applied, because each individual input symbol 410 results in a plurality of indices activated in the sparse binary representation 430, the individual character of the symbols may still be preserved when applied to the category feature model 440. Stated another way, the activation of a particular position in the sparse binary representation 430 indicates that one or more of the input symbols yielding that index in its plurality of positions (from the encoder) was present, while the inactivation (e.g., a value of zero) excludes any symbols that yield that position as part of its encoding. This may permit the category feature model 440 during training to learn the respective contribution of different positions in the sparse binary representation 430 in determining a suitable category vector representation 450. In addition, the potential collisions and "multi-hot" nature of the plurality of indices for each symbol may distribute "information" about a particular symbol to different locations of the sparse binary representation 430 and reduce the likelihood of the category feature model 440 overfitting any particular input symbol 410 in determining a category vector representation 450. The category vector representation 450 is thus a dense vector representation for the specific subset of symbols in the sparse category features 400. The parameters of the category feature model 440 may be learned during training of the recommendation model.

As such, during application of the recommendation model, the values of the category vector representation 450 may be determined based on the symbols of the sparse category features 400, as processed through the encoder and the category feature model 440. To train the recommendation model, parameters for the various components of the recommendation model may be trained (e.g., weights, bias values, activation values, etc.), as well as various architectural hyperparameters, including the number of outputs for each symbol from the encoder (e.g., the number of hash functions k), and the width d of the sparse binary representation 430. As discussed at FIGS. 5-6, the recommendation model may be trained based on a set of training data and by applying the model with a set of current parameters to training data inputs and determining gradients or otherwise modifying parameters to reduce an error of the model parameters with respect to known training data outputs. As such, applying the model to determine a prediction score may be a part of training the model parameters or optimizing model hyperparameters. In deployed, operational recommendation systems, the training data may include data from a previous time period, such as a prior week or month. The training data may then be separated into training and test/validation sets for training and validating the data. In various embodiments, the models may be re-trained to account for newly-received data as users continue to interact with items and other content.

While these may require retrieval of e.g., weights for the category feature model 440, the parameters for the weights may be relatively static in operation. This approach provides several advantages over other recommendation systems, such as those with pre-trained embeddings. In recommendation systems that pre-train embeddings for individual items in a category, sparse features designating a list of items may be represented by retrieving and combining the embeddings for the items in the list to determine a combined representation. In this approach, a large proportion of total parameters of the model as a whole may be represented in the trained embeddings themselves. In addition, the number of parameters used for the trained embeddings may scale linearly with the number of items in a category to effectively represent the items, thus presenting scaling difficulty as the number of items continues to expand. As discussed above, the sparse binary representation 430 may provide a width that effectively expands as O(log N) instead, significantly reducing the required size for representing the symbols of a sparse category. Even including the weights for a category feature model 440, which processes the sparse binary representation 430 to the category vector representation 450, the number of total parameters required for the sparse feature processing discussed herein may be significantly lower than for a solution using pre-trained embeddings.

To compare the performance and required parameters of the model presented herein with a model that represents sparse features using pre-trained embeddings, a model having an architecture shown in FIG. 2 was compared with a "Deep Learning Recommendation Model" (DLRM) model that uses pre-trained embeddings instead of the encoder, sparse binary representation, and category feature model as discussed. In these experiments, the encoder-sparse binary representation-category feature model approach achieved equivalent accuracy to the DLRM model (approximately 0.804 AUC) with a significant reduction in model parameters: 32 million parameters vs. 540 million parameters. In addition, because the encoder and category feature model may be performed at run-time of the model (e.g., after a recommendation request is received from a user), the system may effectively determine a vector representation at the time it is needed (e.g., "on the fly"), rather than pre-training embeddings for the items in a category, which may typically require training embeddings for all items in the category.

TABLE 1

| Parameters (Millions) | Model Size (MB) | Δ AUC vs DLRM | Model Size Reduction |
|---|---|---|---|
| 1 | 4 | −0.0212 | 505x |
| 6 | 24 | −0.0028 | 95x |
| 11 | 44 | −0.0017 | 50x |
| 16 | 64 | −0.0005 | 34x |
| 21 | 84 | −0.0002 | 26x |
| 26 | 104 | 0.0000 | 20x |
| 31 | 124 | +0.0003 | 17x |

Table 1 shows example experiments comparing the performance of recommendation models having a various number of parameters relative to the DLRM model using 540 million parameters (e.g., largely due to pre-trained embeddings). As shown in this comparison the model including six million parameters provides a model size reduction of 95× while losing 0.28% AUC relative to DLRM, while a size reduction of 17× provides a performance improvement relative to DLRM. This result is particularly important in high-value applications of such recommendation systems, where the recommendation system may be applied to millions or billions of recommendation requests each day or week. Such a demonstrable improvement in performance while also significantly reducing the model size demonstrates the effectiveness of the encoder->sparse binary representation approach for characterizing sparse category features used in combination with dense features in a recommendation model. In addition, because the model may operate without extensive embedding table lookups, in various experiments the disclosed approach may operate up to 3.2× the speed of DLRM models in generating prediction scores.

Example Computer Modeling

Figure 5:
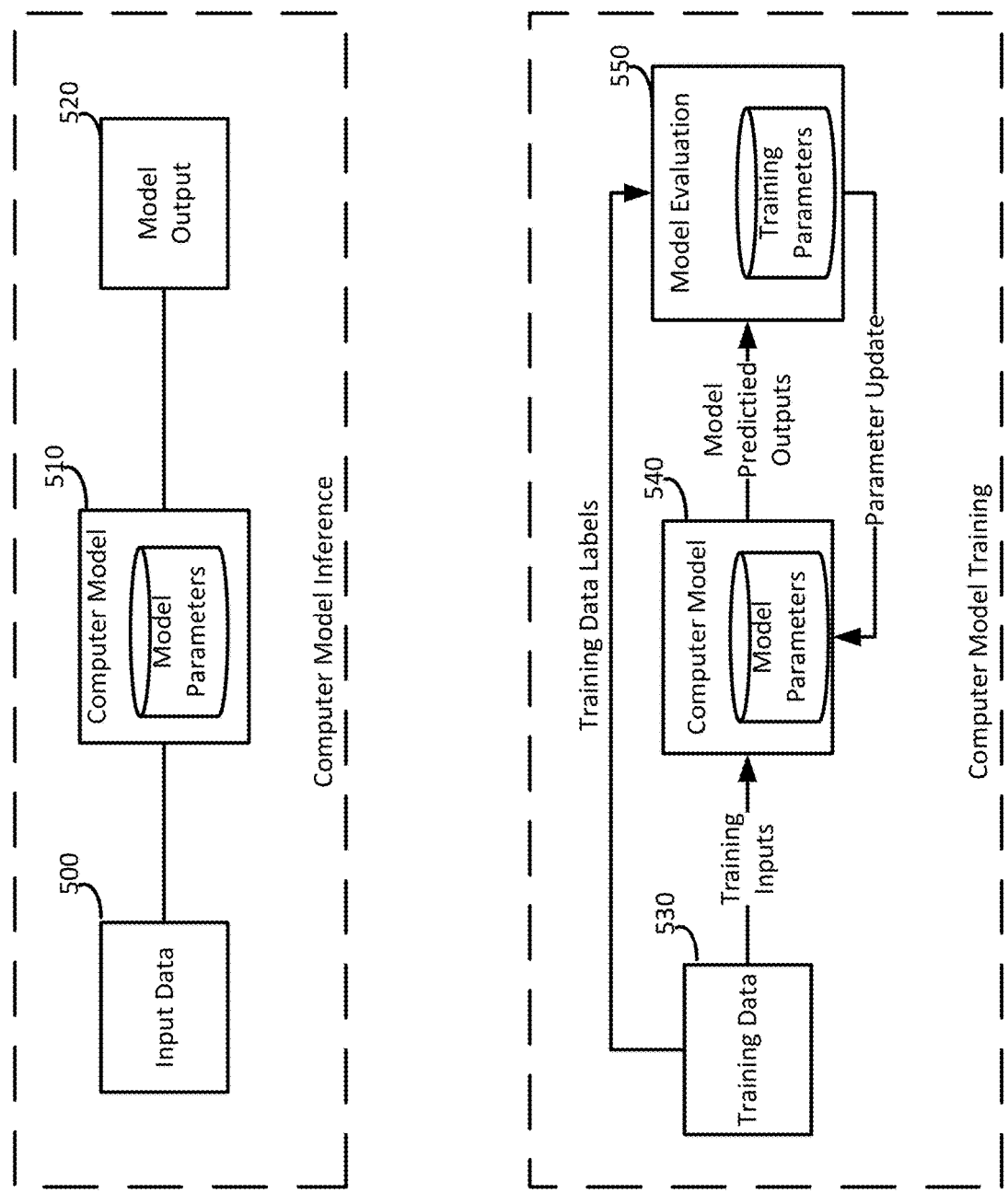
FIG. 5 shows example computer model inference and computer model training.

FIG. 5 shows example computer model inference and computer model training. Computer model inference refers to the application of a computer model 510 to a set of input data 500 to generate an output or model output 520. The computer model 510 determines the model output 520 based on parameters of the model, also referred to as model parameters. The parameters of the model may be determined based on a training process that finds an optimization of the model parameters, typically using training data and desired outputs of the model for the respective training data as discussed below. The output of the computer model may be referred to as an "inference" because it is a predictive value based on the input data 500 and based on previous example data used in the model training.

The input data 500 and the model output 520 vary according to the particular use case. For example, for computer vision and image analysis, the input data 500 may be an image having a particular resolution, such as 75×75 pixels, or a point cloud describing a volume. In other applications, the input data 500 may include a vector, such as a sparse vector, representing information about an object. For example, in recommendation systems, such a vector may represent user-object interactions, such that the sparse vector indicates individual items positively rated by a user. In addition, the input data 500 may be a processed version of another type of input object, for example representing various features of the input object or representing preprocessing of the input object before input of the object to the computer model 510. As one example, a 1024×1024 resolution image may be processed and subdivided into individual image portions of 64×64, which are the input data 500 processed by the computer model 510. As another example, the input object, such as a sparse vector discussed above, may be processed to determine an embedding or another compact representation of the input object that may be used to represent the object as the input data 500 in the computer model 510. Such additional processing for input objects may themselves be learned representations of data, such that another computer model processes the input objects to generate an output that is used as the input data 500 for the computer model 510. Although not further discussed here, such further computer models may be independently or jointly trained with the computer model 510.

As noted above, the model output 520 may depend on the particular application of the computer model 510, and represent recommendation systems, computer vision systems, classification systems, labeling systems, weather prediction, autonomous control, and any other type of modeling output/prediction.

The computer model 510 includes various model parameters, as noted above, that describe the characteristics and functions that generate the model output 520 from the input data 500. In particular, the model parameters may include a model structure, model weights, and a model execution environment. The model structure may include, for example, the particular type of computer model 510 and its structure and organization. For example, the model structure may designate a neural network, which may be comprised of multiple layers, and the model parameters may describe individual types of layers included in the neural network and the connections between layers (e.g., the output of which layers constitute inputs to which other layers). Such networks may include, for example, feature extraction layers, convolutional layers, pooling/dimensional reduction layers, activation layers, output/predictive layers, and so forth. While in some instances the model structure may be determined by a designer of the computer model, in other examples, the model structure itself may be learned via a training process and may thus form certain "model parameters" of the model.

The model weights may represent the values with which the computer model 510 processes the input data 500 to the model output 520. Each portion or layer of the computer model 510 may have such weights. For example, weights may be used to determine values for processing inputs to determine outputs at a particular portion of a model. Stated another way, for example, model weights may describe how to combine or manipulate values of the input data 500 or thresholds for determining activations as output for a model. As one example, a convolutional layer typically includes a set of convolutional "weights," also termed a convolutional kernel, to be applied to a set of inputs to that layer. These are subsequently combined, typically along with a "bias" parameter, and weights for other transformations to generate an output for the convolutional layer.

The model execution parameters represent parameters describing the execution conditions for the model. In particular, aspects of the model may be implemented on various types of hardware or circuitry for executing the computer model. For example, portions of the model may be implemented in various types of circuitry, such as general-purpose circuitry (e.g., a general CPU), circuitry specialized for certain computer model functions (e.g., a GPU or programmable Multiply-and-Accumulate circuit) or circuitry specially designed for the particular computer model application. In some configurations, different portions of the computer model 510 may be implemented on different types of circuitry. As discussed below, training of the model may include optimizing the types of hardware used for certain aspects of the computer model (e.g., co-trained), or may be determined after other parameters for the computer model are determined without regard to configuration executing the model. In another example, the execution parameters may also determine or limit the types of processes or functions available at different portions of the model, such as value ranges available at certain points in the processes, operations available for performing a task, and so forth.

Computer model training may thus be used to determine or "train" the values of the model parameters for the computer model 540. During training, the model parameters are optimized to "learn" values of the model parameters (such as individual weights, activation values, model execution environment, etc.), that improve the model parameters based on an optimization function that seeks to improve a cost function (also sometimes termed a loss function). Before training, the computer model 540 has model parameters that have initial values that may be selected in various ways, such as by a randomized initialization, initial values selected based on other or similar computer models, or by other means. During training, the model parameters are modified based on the optimization function to improve the cost/loss function relative to the prior model parameters.

In many applications, training data 530 includes a data set to be used for training the computer model 540. The data set varies according to the particular application and purpose of the computer model 540. In supervised learning tasks, the training data typically includes a set of training data labels that describe the training data and the desired output of the model relative to the training data. For example, for an object classification task, the training data may include individual images in which individual portions, regions or pixels in the image are labeled with the classification of the object. For this task, the training data may include a training data image depicting a dog and a person and a training data labels that label the regions of the image that include the dog and the person, such that the computer model is intended to learn to also label the same portions of that image as a dog and a person, respectively.

To train the computer model, a training module (not shown) applies the training data 530 to the computer model 540 to determine the outputs predicted by the model for the given training inputs. The training module, though not shown, is a computing module used for performing the training of the computer model by executing the computer model according to its inputs and outputs given the model's parameters and modifying the model parameters based on the results. The training module may apply the actual execution environment of the computer model 540, or may simulate the results of the execution environment, for example to estimate the performance, runtime, memory, or circuit area (e.g., if specialized hardware is used) of the computer model. The training module, along with the training data and model evaluation, may be instantiated in software and/or hardware by one or more processing devices such as the example computing device 700 shown in FIG. 7. In various examples, the training process may also be performed by multiple computing systems in conjunction with one another, such as distributed/cloud computing systems.

After processing the training inputs according to the current model parameters for the computer model 540, the model's predicted outputs are evaluated 550, and the computer model is evaluated with respect to the cost function and optimized using an optimization function of the training model. Depending on the optimization function, particular training process and training parameters after the model evaluation are updated to improve the optimization function of the computer model. In supervised training (i.e., training data labels are available), the cost function may evaluate the model's predicted outputs relative to the training data labels and to evaluate the relative cost or loss of the prediction relative to the "known" labels for the data. This provides a measure of the frequency of correct predictions by the computer model and may be measured in various ways, such as the precision (frequency of false positives) and recall (frequency of false negatives). The cost function in some circumstances may evaluate may also evaluate other characteristics of the model, for example the model complexity, processing speed, memory requirements, physical circuit characteristics (e.g., power requirements, circuit throughput) and other characteristics of the computer model structure and execution environment (e.g., to evaluate or modify these model parameters).

After determining results of the cost function, the optimization function determines a modification of the model parameters to improve the cost function for the training data. Many such optimization functions are known to one skilled on the art. Many such approaches differentiate the cost function with respect to the parameters of the model and determine modifications to the model parameters that thus improves the cost function. The parameters for the optimization function, including algorithms for modifying the model parameters are the training parameters for the optimization function. For example, the optimization algorithm may use gradient descent (or its variants), momentum-based optimization, or other optimization approaches used in the art and as appropriate for the particular use of the model. The optimization algorithm thus determines the parameter updates to the model parameters. In some implementations, the training data is batched and the parameter updates are iteratively applied to batches of the training data. For example, the model parameters may be initialized, then applied to a first batch of data to determine a first modification to the model parameters. The second batch of data may then be evaluated with the modified model parameters to determine a second modification to the model parameters, and so forth, until a stopping point, typically based on either the amount of training data available or the incremental improvements in model parameters are below a threshold (e.g., additional training data no longer continues to improve the model parameters). Additional training parameters may describe the batch size for the training data, a portion of training data to use as validation data, the step size of parameter updates, a learning rate of the model, and so forth. Additional techniques may also be used to determine global optimums or address nondifferentiable model parameter spaces.

Figure 6:
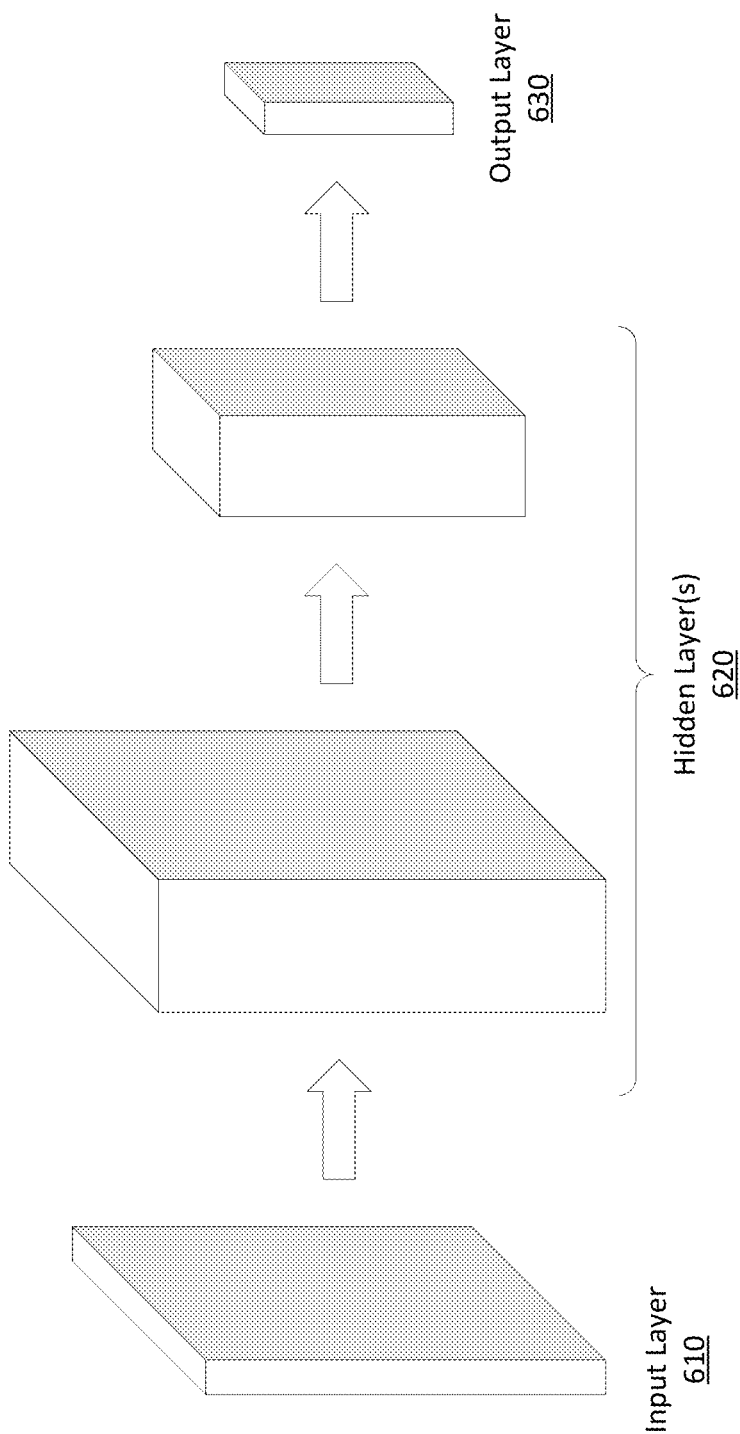
FIG. 6 illustrates an example neural network architecture.

FIG. 6 illustrates an example neural network architecture. In general, a neural network includes an input layer 610, one or more hidden layers 620, and an output layer 630. The values for data in each layer of the network is generally determined based on one or more prior layers of the network. Each layer of a network generates a set of values, termed "activations" that represent the output values of that layer of a network and may be the input to the next layer of the network. For the input layer 610, the activations are typically the values of the input data, although the input layer 610 may represent input data as modified through one or more transformations to generate representations of the input data. For example, in recommendation systems, interactions between users and objects may be represented as a sparse matrix. Individual users or objects may then be represented as an input layer 610 as a transformation of the data in the sparse matrix relevant to that user or object. The neural network may also receive the output of another computer model (or several), as its input layer 610, such that the input layer 610 of the neural network shown in FIG. 6 is the output of another computer model. Accordingly, each layer may receive a set of inputs, also termed "input activations," representing activations of one or more prior layers of the network and generate a set of outputs, also termed "output activations" representing the activation of that layer of the network. Stated another way, one layer's output activations become the input activations of another layer of the network (except for the final output layer of 630 of the network.

Each layer of the neural network typically represents its output activations (i.e., also termed its outputs) in a matrix, which may be 1, 2, 3, or n-dimensional according to the particular structure of the network. As shown in FIG. 6, the dimensionality of each layer may differ according to the design of each layer. The dimensionality of the output layer 630 depend on the characteristics of the prediction made by the model. For example, a computer model for multi-object classification may generate an output layer 630 having a one-dimensional array in which each position in the array represents the likelihood of a different classification for the input layer 610. In another example for classification of portions of an image, the input layer 610 may be an image having a resolution, such as 512×512, and the output layer may be a 512×512×n matrix in which the output layer 630 provides n classification predictions for each of the input pixels, such that the corresponding position of each pixel in the input layer 610 in the output layer 630 is an n-dimensional array corresponding to the classification predictions for that pixel.

The hidden layers 620 provide output activations that variously characterize the input layer 610 in various ways that assist in effectively generating the output layer 630. The hidden layers thus may be considered to provide additional features or characteristics of the input layer 610. Though two hidden layers are shown in FIG. 6, in practice any number of hidden layers may be provided in various neural network structures.

Each layer generally determines the output activation values of positions in its activation matrix based on the output activations of one or more previous layers of the neural network (which may be considered input activations to the layer being evaluated). Each layer applies a function to the input activations to generate its activations. Such layers may include fully-connected layers (e.g., every input is connected to every output of a layer), convolutional layers, deconvolutional layers, pooling layers, and recurrent layers. Various types of functions may be applied by a layer, including linear combinations, convolutional kernels, activation functions, pooling, and so forth. The parameters of a layer's function are used to determine output activations for a layer from the layer's activation inputs and are typically modified during the model training process. The parameters describing the contribution of a particular portion of a prior layer is typically termed a weight. For example, in some layers, the function is a multiplication of each input with a respective weight to determine the activations for that layer. For a neural network, the parameters for the model as a whole thus may include the parameters for each of the individual layers and in large-scale networks can include hundreds of thousands, millions, or more of different parameters.

As one example for training a neural network, the cost function is evaluated at the output layer 630. To determine modifications of the parameters for each layer, the parameters of each prior layer may be evaluated to determine respective modifications. In one example, the cost function (or "error") is backpropagated such that the parameters are evaluated by the optimization algorithm for each layer in sequence, until the input layer 610 is reached.

Example Devices

Figure 7:
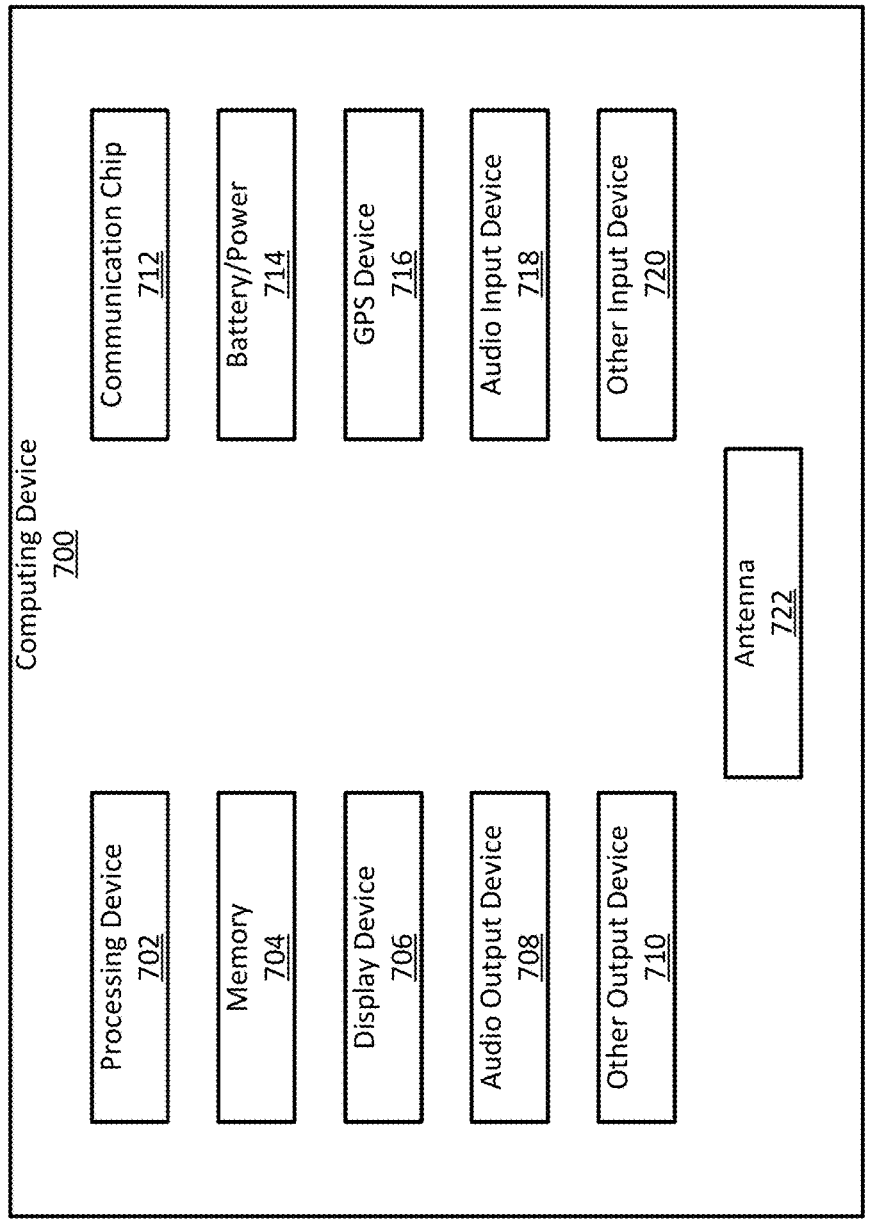
FIG. 7 is a block diagram of an example computing device that may include one or more components used for training, analyzing, or implementing a computer model in accordance with any of the embodiments disclosed herein.

FIG. 7 is a block diagram of an example computing device 700 that may include one or more components used for training, analyzing, or implementing a computer model in accordance with any of the embodiments disclosed herein. For example, the computing device 700 may include a training module for training a computer model and may include a trained computer model for executing functions of the computing device 700, and in some circumstances may include specialized hardware and/or software for executing the computer model.

A number of components are illustrated in FIG. 7 as included in the computing device 700, but any one or more of these components may be omitted or duplicated, as suitable for the application. In some embodiments, some or all of the components included in the computing device 700 may be attached to one or more motherboards. In some embodiments, some or all of these components are fabricated onto a single system-on-a-chip (SoC) die.

Additionally, in various embodiments, the computing device 700 may not include one or more of the components illustrated in FIG. 7, but the computing device 700 may include interface circuitry for coupling to the one or more components. For example, the computing device 700 may not include a display device 706, but may include display device interface circuitry (e.g., a connector and driver circuitry) to which a display device 706 may be coupled. In another set of examples, the computing device 700 may not include an audio input device 724 or an audio output device 708 but may include audio input or output device interface circuitry (e.g., connectors and supporting circuitry) to which an audio input device 724 or audio output device 708 may be coupled.

The computing device 700 may include a processing device 702 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 700 may include a memory 704, which may itself include one or more memory devices such as volatile memory (e.g., dynamic random-access memory (DRAM)), nonvolatile memory (e.g., read-only memory (ROM)), flash memory, solid state memory, and/or a hard drive. The memory 1104 may include instructions executable by the processing device for performing methods and functions as discussed herein. Such instructions may be instantiated in various types of memory, which may include non-volatile memory and as stored on one or more non-transitory mediums. In some embodiments, the memory 704 may include memory that shares a die with the processing device 702. This memory may be used as cache memory and may include embedded dynamic random-access memory (eDRAM) or spin transfer torque magnetic random-access memory (STT-MRAM).

In some embodiments, the computing device 700 may include a communication chip 712 (e.g., one or more communication chips). For example, the communication chip 712 may be configured for managing wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 712 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 712 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 712 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 712 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 712 may operate in accordance with other wireless protocols in other embodiments. The computing device 700 may include an antenna 722 to facilitate wireless communications and/or to receive other wireless communications (such as AM or FM radio transmissions).

In some embodiments, the communication chip 712 may manage wired communications, such as electrical, optical, or any other suitable communication protocols (e.g., the Ethernet). As noted above, the communication chip 712 may include multiple communication chips. For instance, a first communication chip 712 may be dedicated to shorter-range wireless communications such as Wi-Fi or Bluetooth, and a second communication chip 712 may be dedicated to longer-range wireless communications such as global positioning system (GPS), EDGE, GPRS, CDMA, WiMAX, LTE, EV-DO, or others. In some embodiments, a first communication chip 712 may be dedicated to wireless communications, and a second communication chip 712 may be dedicated to wired communications.

The computing device 700 may include battery/power circuitry 714. The battery/power circuitry 714 may include one or more energy storage devices (e.g., batteries or capacitors) and/or circuitry for coupling components of the computing device 700 to an energy source separate from the computing device 700 (e.g., AC line power).

The computing device 700 may include a display device 706 (or corresponding interface circuitry, as discussed above). The display device 706 may include any visual indicators, such as a heads-up display, a computer monitor, a projector, a touchscreen display, a liquid crystal display (LCD), a light-emitting diode display, or a flat panel display, for example.

The computing device 700 may include an audio output device 708 (or corresponding interface circuitry, as discussed above). The audio output device 708 may include any device that generates an audible indicator, such as speakers, headsets, or earbuds, for example.

The computing device 700 may include an audio input device 724 (or corresponding interface circuitry, as discussed above). The audio input device 724 may include any device that generates a signal representative of a sound, such as microphones, microphone arrays, or digital instruments (e.g., instruments having a musical instrument digital interface (MIDI) output).

The computing device 700 may include a GPS device 718 (or corresponding interface circuitry, as discussed above). The GPS device 718 may be in communication with a satellite-based system and may receive a location of the computing device 700, as known in the art.

The computing device 700 may include an other output device 710 (or corresponding interface circuitry, as discussed above). Examples of the other output device 710 may include an audio codec, a video codec, a printer, a wired or wireless transmitter for providing information to other devices, or an additional storage device.

The computing device 700 may include an other input device 720 (or corresponding interface circuitry, as discussed above). Examples of the other input device 720 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 700 may have any desired form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 700 may be any other electronic device that processes data.

Select Examples

The following paragraphs provide various examples of the embodiments disclosed herein.

Example 1 provides for a method for automated generation of a recommendation score of an item for a user, the method including: identifying a set of dense features and a set of sparse category features associated with recommending the item to the user, the set of sparse category features describing a subset of symbols belonging to an alphabet of category symbols; determining a sparse binary representation of the set of sparse features with an encoder applied to each of the symbols of the set of sparse category features; determining a category vector representation with a category feature model applied to the sparse binary representation; and generating the recommendation score of the item for the user with a prediction model based on the set of dense features and the category vector representation.

Example 2 provides for the method of claim 1, wherein each symbol in the alphabet of category symbols represents a different item in a category.

Example 3 provides for the method of claim 1 or 2, wherein the sparse binary representation has a plurality of positions and wherein the encoder applied to a symbol designates a plurality of indices; and wherein determining the sparse binary representation comprises setting positions of the sparse binary representation to a value of one if an index of the position is included in the plurality of indices for the encoder applied to any of the symbols of the set of sparse category features.

Example 4 provides for the method of any of claims 1-3, wherein the encoder is not trained.

Example 5 provides for the method of any of claims 1-4, wherein the encoder includes a plurality of hash functions.

Example 6 provides for the method of claim 5, wherein the hash functions are murmur hash functions.

Example 7 provides for the method of any of claims 1-6, wherein the sparse binary representation is determined after receiving a request to generate the recommendation.

Example 8 provides for the method of any of claims 1-7, further comprising: receiving a request from a device for a content recommendation for a user; wherein the set of sparse features is associated with the user and the recommendation is provided to the device based on the recommendation.

Example 9 provides for the method of claim 8, wherein the set of sparse features include items associated with the user in a category of the alphabet of category symbols.

Example 10 provides for the method of claims 1-9, wherein the category feature model is a computer model with trained parameters.

Example 11 provides for the method of any of claims 1-10, wherein the prediction model is a computer model with trained parameters.

Example 12 provides for the method of any of claims 1-11, further comprising determining a dense vector representation of the set of dense features based on a dense model; and further wherein the prediction model generates the prediction with the dense vector representation and the category vector representation.

Example 13 provides for the method of any of claims 1-12, wherein the prediction model is a multi-layer perceptron.

Example 14 provides for the method of any of claims 1-13, wherein the category feature model is a multi-layer perceptron.

Example 15 provides for the method of any of claims 1-14, wherein the dense features and the sparse category features are included in a set of training data and further comprising training parameters of the category feature model based on the generated recommendation relative to a known value in the set of training data.

Example 16 provides for the method of claim 15, wherein parameters of the category feature model are jointly trained with parameters of the prediction model.

Example 17 provides for the method of claim 15-16, wherein parameters of the category feature model are jointly trained with parameters of a dense model that determines a dense vector representation based on the set of dense features.

Example 18 provides for the method of any of claims 1-17, further comprising determining a number of positions of the sparse binary representation or a number of hash functions of the encoder.

Example 19 provides for a system including a processor; and a non-transitory computer-readable storage medium containing computer program code for execution by the processor for: identifying a set of dense features and a set of sparse category features associated with recommending the item to the user, the set of sparse category features describing a subset of symbols belonging to an alphabet of category symbols; determining a sparse binary representation of the set of sparse features with an encoder applied to each of the symbols of the set of sparse category features; determining a category vector representation with a category feature model applied to the sparse binary representation; and generating the recommendation score of the item for the user with a prediction model based on the set of dense features and the category vector representation.

Example 20 provides for the system of claim 19, wherein each symbol in the alphabet of category symbols represents a different item in a category.

Example 21 provides for the system of claim 19 or 20, wherein the sparse binary representation has a plurality of positions and wherein the encoder applied to a symbol designates a plurality of indices; and wherein determining the sparse binary representation comprises setting positions of the sparse binary representation to a value of one if an index of the position is included in the plurality of indices for the encoder applied to any of the symbols of the set of sparse category features.

Example 22 provides for the system of any of claims 19-21, wherein the encoder is not trained.

Example 23 provides for the system of any of claims 19-22, wherein the encoder includes a plurality of hash functions.

Example 24 provides for the system of claim 23, wherein the hash functions are murmur hash functions.

Example 25 provides for the system of any of claims 19-24, wherein the sparse binary representation is determined after receiving a request to generate the recommendation.

Example 26 provides for the system of any of claims 19-25, the instructions further for: receiving a request from a device for a content recommendation for a user; wherein the set of sparse features is associated with the user and the recommendation is provided to the device based on the recommendation.

Example 27 provides for the system of claim 26, wherein the set of sparse features include items associated with the user in a category of the alphabet of category symbols.

Example 28 provides for the system of any of claims 19-27, wherein the category feature model is a computer model with trained parameters.

Example 29 provides for the system of any of claims 19-28, wherein the prediction model is a computer model with trained parameters.

Example 30 provides for the system of any of claims 19-29, the instructions further being for determining a dense vector representation of the set of dense features based on a dense model; and further wherein the prediction model generates the prediction with the dense vector representation and the category vector representation.

Example 31 provides for the system of any of claims 19-30, wherein the prediction model is a multi-layer perceptron.

Example 32 provides for the system of any of claims 19-31, wherein the category feature model is a multi-layer perceptron.

Example 33 provides for the system of any of claims 19-32, wherein the dense features and the sparse category features are included in a set of training data and the instructions further being for training parameters of the category feature model based on the generated recommendation relative to a known value in the set of training data.

Example 34 provides for the system of claim 33, wherein parameters of the category feature model are jointly trained with parameters of the prediction model.

Example 35 provides for the system of claim 33 or 34, wherein parameters of the category feature model are jointly trained with parameters of a dense model that determines a dense vector representation based on the set of dense features.

Example 36 provides for the system of any of claims 19-35, the instructions further for: determining a number of positions of the sparse binary representation or a number of hash functions of the encoder.

Example 37 provides for a non-transitory computer-readable storage medium containing instructions executable by a processor for: identifying a set of dense features and a set of sparse category features associated with recommending the item to the user, the set of sparse category features describing a subset of symbols belonging to an alphabet of category symbols; determining a sparse binary representation of the set of sparse features with an encoder applied to each of the symbols of the set of sparse category features; determining a category vector representation with a category feature model applied to the sparse binary representation; and generating the recommendation score of the item for the user with a prediction model based on the set of dense features and the category vector representation.

Example 38 provides for the non-transitory computer-readable storage medium of claim 37, wherein each symbol in the alphabet of category symbols represents a different item in a category.

Example 39 provides for the non-transitory computer-readable storage medium of claim 37 or 38, wherein the sparse binary representation has a plurality of positions and wherein the encoder applied to a symbol designates a plurality of indices; and wherein determining the sparse binary representation comprises setting positions of the sparse binary representation to a value of one if an index of the position is included in the plurality of indices for the encoder applied to any of the symbols of the set of sparse category features.

Example 40 provides for the non-transitory computer-readable storage medium of any of claims 37-39, wherein the encoder is not trained.

Example 41 provides for the non-transitory computer-readable storage medium of any of claims 37-40, wherein the encoder includes a plurality of hash functions.

Example 42 provides for the non-transitory computer-readable storage medium of claim 41, wherein the hash functions are murmur hash functions.

Example 43 provides for the non-transitory computer-readable storage medium of any of claims 37-42, wherein the sparse binary representation is determined after receiving a request to generate the recommendation.

Example 44 provides for the non-transitory computer-readable storage medium of any of claims 37-43, the instructions further for: receiving a request from a device for a content recommendation for a user; wherein the set of sparse features is associated with the user and the recommendation is provided to the device based on the recommendation.

Example 45 provides for the non-transitory computer-readable medium of claim 44, wherein the set of sparse features include items associated with the user in a category of the alphabet of category symbols.

Example 46 provides for the non-transitory computer-readable storage medium of claim 45, wherein the category feature model is a computer model with trained parameters.

Example 47 provides for the non-transitory computer-readable storage medium of claim 45 or 46, wherein the prediction model is a computer model with trained parameters.

Example 48 provides for the non-transitory computer-readable storage medium of any of claims 37-47, the instructions further being for determining a dense vector representation of the set of dense features based on a dense model; and further wherein the prediction model generates the prediction with the dense vector representation and the category vector representation.

Example 49 provides for the non-transitory computer-readable storage medium of any of claims 37-48, wherein the prediction model is a multi-layer perceptron.

Example 50 provides for the non-transitory computer-readable storage medium of any of claims 37-49, wherein the category feature model is a multi-layer perceptron.

Example 51 provides for the non-transitory computer-readable storage medium of any of claims 37-50, wherein the dense features and the sparse category features are included in a set of training data and the instructions further being for training parameters of the category feature model based on the generated recommendation relative to a known value in the set of training data.

Example 52 provides for the system of claim 51, wherein parameters of the category feature model are jointly trained with parameters of the prediction model.

Example 53 provides for the system of claim 51 or 52, wherein parameters of the category feature model are jointly trained with parameters of a dense model that determines a dense vector representation based on the set of dense features.

Example 54 provides for the non-transitory computer-readable storage medium of any of claims 37-53, the instructions further for: determining a number of positions of the sparse binary representation or a number of hash functions of the encoder.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

What is claimed is:

1. A method for recommending an item to a user, the method comprising:
   identifying a set of dense features and a set of sparse category features associated with recommending the item to the user, the set of sparse category features describing a subset of symbols belonging to an alphabet of category symbols;
   determining, by a dense model, a dense vector from the set of dense features;
   determining a sparse binary representation of the set of sparse features with an encoder applied to each of the symbols of the set of sparse category features;
   determining, by a category feature model, a category vector representation from the sparse binary representation; and
   inputting the dense vector and the category vector representation into a prediction model, the prediction model outputting a recommendation score of the item for the user; and
   providing a recommendation of the item for the user based on the recommendation score,
   wherein the dense model, category feature model, and prediction model are trained neural networks.

2. The method of claim 1, wherein each symbol in the alphabet of category symbols represents a different item in a category.

3. The method of claim 1, wherein the sparse binary representation has a plurality of positions and wherein the encoder applied to a symbol designates a plurality of indices; and wherein determining the sparse binary representation comprises setting positions of the sparse binary representation to a value of one if an index of the position is included in the plurality of indices for the encoder applied to any of the symbols of the set of sparse category features.

4. The method of claim 1, wherein the encoder includes a plurality of hash functions.

5. The method of claim 1, further comprising:
   receiving a request from the device for a content recommendation for the user,
   wherein the recommendation is provided to the device in response to the request.

6. The method of claim 5, wherein the set of sparse features includes items associated with the user in a category of the alphabet of category symbols.

7. The method of claim 1, wherein the dense features and the sparse category features are included in a set of training data, wherein the method further comprises further training the category feature model based on the recommendation score and the set of training data.

8. A system comprising:
   a processor; and
   a non-transitory computer-readable storage medium storing instructions executable by the processor to perform operations for recommending an item to a user, the operations comprising:
      identifying a set of dense features and a set of sparse category features associated with recommending the item to the user, the set of sparse category features describing a subset of symbols belonging to an alphabet of category symbols,
      determining, by a dense model, a dense vector from the set of dense features,
      determining a sparse binary representation of the set of sparse features with an encoder applied to each of the symbols of the set of sparse category features,
      determining, by a category feature model, a category vector representation from the sparse binary representation;
      inputting the dense vector and the category vector representation into a prediction model, the prediction model outputting a recommendation score of the item for the user, and
      providing a recommendation of the item for the user to a device based on the recommendation score,
      wherein the dense model, category feature model, and prediction model are trained neural networks.

9. The system of claim 8, wherein each symbol in the alphabet of category symbols represents a different item in a category.

10. The system of claim 8, wherein the sparse binary representation has a plurality of positions and wherein the encoder applied to a symbol designates a plurality of indices; and wherein determining the sparse binary representation comprises setting positions of the sparse binary representation to a value of one if an index of the position is included in the plurality of indices for the encoder applied to any of the symbols of the set of sparse category features.

11. The system of claim 8, wherein the encoder includes a plurality of hash functions.

12. The system of claim 8, wherein the operations further comprise:
   receiving a request from the device for a content recommendation for a user,
   wherein the recommendation is provided to the device in response to the request.

13. The system of claim 12, wherein the set of sparse features includes items associated with the user in a category of the alphabet of category symbols.

14. The system of claim 8, wherein the dense features and the sparse category features are included in a set of training data and the operations further comprise further training the category feature model based on the recommendation score and in the set of training data.

15. A non-transitory computer-readable storage medium storing instructions executable by a processor to perform operations for recommending an item to a user, the operations comprising:
   identifying a set of dense features and a set of sparse category features associated with recommending the item to the user, the set of sparse category features describing a subset of symbols belonging to an alphabet of category symbols;

determining, by a dense model, a dense vector from the set of dense features;

determining a sparse binary representation of the set of sparse features with an encoder applied to each of the symbols of the set of sparse category features;

determining, by a category feature model, a category vector representation from the sparse binary representation;

inputting the dense vector and the category vector representation into a prediction model, the prediction model outputting a recommendation score of the item for the user; and providing a recommendation of the item for the user to a device based on the recommendation score, wherein the dense model, category feature model, and prediction model are trained neural networks.

16. The non-transitory computer-readable storage medium of claim 15, wherein each symbol in the alphabet of category symbols represents a different item in a category.

17. The non-transitory computer-readable storage medium of claim 15, wherein the sparse binary representation has a plurality of positions and wherein the encoder applied to a symbol designates a plurality of indices; and wherein determining the sparse binary representation comprises setting positions of the sparse binary representation to a value of one if an index of the position is included in the plurality of indices for the encoder applied to any of the symbols of the set of sparse category features.

18. The non-transitory computer-readable storage medium of claim 15, wherein the encoder includes a plurality of hash functions.

19. The non-transitory computer-readable storage medium of claim 15, wherein the operations further comprise:

receiving a request from the device for a content recommendation for a user, wherein the recommendation is provided to the device in response to the request.

20. The non-transitory computer-readable medium of claim 19, wherein the set of sparse features includes items associated with the user in a category of the alphabet of category symbols.

* * * * *

UNITED STATES PATENT AND TRADEMARK OFFICE
CERTIFICATE OF CORRECTION

| | | |
|---|---|---|
| PATENT NO. | : 12,373,874 B2 | Page 1 of 1 |
| APPLICATION NO. | : 17/557949 | |
| DATED | : July 29, 2025 | |
| INVENTOR(S) | : Gopi Krishna Jha et al. | |

It is certified that error appears in the above-identified patent and that said Letters Patent is hereby corrected as shown below:

On the Title Page

On Page 2, in Item (56), under "Other Publications", in Column 2, Line 4, delete "al," and insert -- al., --, therefor.

On Page 2, in Item (56), under "Other Publications", in Column 2, Line 16, delete "Maxim,," and insert -- Maxim, --, therefor.

In the Claims

In Column 25, Claim 1, Lines 34-35, delete "representation; and" and insert -- representation; --, therefor.

In Column 26, Claim 8, Lines 21-22, delete "representation;" and insert -- representation, --, therefor.

In Column 26, Claim 14, Lines 58, delete "in the" and insert -- the --, therefor.

In Column 28, Claim 20, Lines 18, delete "medium" and insert -- storage medium --, therefor.

Signed and Sealed this
Second Day of September, 2025

Coke Morgan Stewart
*Acting Director of the United States Patent and Trademark Office*